(12) United States Patent
Vyas et al.

(10) Patent No.: US 12,309,320 B2
(45) Date of Patent: May 20, 2025

(54) SYSTEM AND METHODS OF IDENTIFYING AND UTILIZING AGENT CREDIBILITY DIVERGENCE IN CONTACT CENTER QUALITY PROCESSES

(71) Applicant: NICE LTD, Ra'anana (IL)

(72) Inventors: Rahul Vyas, Rajasthan (IN); Salil Dhawan, Pune (IN); Jason Williams, Sandy, UT (US)

(73) Assignee: NICE LTD., Ra'anana (IL)

( * ) Notice: Subject to any disclaimer, the term of this patent is extended or adjusted under 35 U.S.C. 154(b) by 376 days.

(21) Appl. No.: 17/850,481

(22) Filed: Jun. 27, 2022

(65) Prior Publication Data

US 2023/0421695 A1 Dec. 28, 2023

(51) Int. Cl.
*H04M 3/00* (2024.01)
*H04M 3/51* (2006.01)

(52) U.S. Cl.
CPC ................................ *H04M 3/5175* (2013.01)

(58) Field of Classification Search
CPC .......................... H04M 3/5175; H04M 3/5233
See application file for complete search history.

(56) References Cited

U.S. PATENT DOCUMENTS

| | | | |
|---|---|---|---|
| 7,864,946 B1* | 1/2011 | Fama | H04M 3/5175 379/265.06 |
| 9,392,114 B1* | 7/2016 | Bobowski | H04M 3/5175 |
| 2015/0195406 A1* | 7/2015 | Dwyer | G10L 15/02 379/265.07 |
| 2022/0122183 A1* | 4/2022 | Jacob | G06F 11/323 |

\* cited by examiner

*Primary Examiner* — Rasha S Al Aubaidi
(74) *Attorney, Agent, or Firm* — Haynes and Boone, LLP (57) ABSTRACT

Agent credibility systems and methods, and non-transitory computer readable media, include receiving a recorded interaction between a customer and a contact center agent; retrieving or determining a credibility divergence determinant (CDD) score of the contact center agent, wherein the CDD score is based on values of a plurality of credibility assessment factors for a time interval that are stored in a historical agent database, and wherein the lower the CDD score, the higher a credibility of the contact center agent; filtering out the recorded interaction when the CDD score is less than or equal to a defined threshold; and providing the recorded interaction to a supervisor of the contact center agent or a quality management application when the CDD score is greater than the defined threshold.

20 Claims, 6 Drawing Sheets

SYSTEM AND METHODS OF IDENTIFYING AND UTILIZING AGENT CREDIBILITY DIVERGENCE IN CONTACT CENTER QUALITY PROCESSES

TECHNICAL FIELD

The present disclosure relates generally to methods and systems for evaluating agent credibility, and more specifically relates to methods and systems that determine an agent's credibility over a longer time period before taking disciplinary action.

BACKGROUND

Contact centers rely on agents to provide good customer service with every interaction. Without productive agents, a contact center risks losing clients, its reputation, and revenue.

There can be instances where an agent's performance is temporarily affected, but is not an indicator of a long-term performance problem. In some cases, the contact center starts taking immediate cascading actions such as assignment of training programs to agents instead of taking a holistic approach.

Contact centers should avoid immediate cascading measures in the case of a temporary performance issue as this could negatively impact an agent's morale. Contact center supervisors and managers need a method of determining an agent's credibility over a longer time period to enable them to understand when it is appropriate to take immediate action.

Accordingly, a need exists for improved systems and methods for evaluating an agent's long-term performance.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

This description and the accompanying drawings that illustrate aspects, embodiments, implementations, or applications should not be taken as limiting—the claims define the protected invention. Various mechanical, compositional, structural, user interface, electrical, and operational changes may be made without departing from the spirit and scope of this description and the claims. In some instances, well-known circuits, structures, on-screen arrangements, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The present invention aims to evaluate agent credibility divergence in a contact center. In various embodiments, credibility divergence is determined only for those agents who satisfy a certain criterion, e.g., agents who served the organization for a certain number of years. The present invention avoids a "knee-jerk" or over-reaction in case there is a temporary lag or dip in agent performance. Advantageously, this minimizes or avoids assignment of training programs to certain agents that do not warrant it. This can also minimize or even avoid attrition of long-term employees due to short-term performance hiccups. The present invention assists in keeping agent morale high and reducing attrition, and can ultimately lead to increased agent productivity and better customer experience, thus impacting contact center efficiency in a decisive way.

In one or more embodiments, a recorded interaction between a customer and a contact center agent (also referred to herein as an "agent") is received. A credibility divergence determinant (CDD) score of the contact center agent is then retrieved or determined. The CDD score is a measure of how credible, dependable, or reliable the contact center agent has been in past interactions. The CDD score is a way to characterize past performance of the contact center agent. As such, the CDD score is based on values of a plurality of credibility assessment factors for a certain time interval. Examples of credibility assessment factors include past scores for key performance indicators (KPIs), customer feedback for past interactions, and past manager feedback. The lower the CDD score, the higher the credibility of the contact center agent. Once the CDD score is obtained, it is determined whether or not the recorded interaction should be passed to quality management based on a defined threshold that is configurable. In an exemplary embodiment, if the CDD score is less than or equal to one, the recorded interaction is filtered out and not provided to quality management. If the CDD score is greater than one, the recorded interaction is provided to a supervisor of the contact center agent or a quality management application. In one or more embodiments, an upper limit of the CDD score is 100. That is, the CDD score can be greater than 0 and up to about 100.

In some embodiments, determining the CDD score includes first determining that the contact center agent satisfies one or more criteria for a credibility assessment. For example, one criterion may be that the contact center agent has served a company or organization for a certain number of years. Other criteria include that the agent has received consistent assessments, employer assessments above a predetermined threshold, has received good customer satisfaction ratings above a predetermined threshold, has received good feedback on the overall behavioral aspect for interactions the agent has handled over a certain period of time, or the like. If the contact center agent is suitable for a credibility assessment, values or scores of various credibility assessment factors can be retrieved from a historical agent database for the certain time interval. The CDD score of the contact center agent can then be calculated based on these values.

In various embodiments, calculating the CDD score includes first calculating a confidence interval estimate for each of the various credibility assessment factors. Confidence interval estimates are helpful to minimize the variation of the data points of credibility of agents across the contact center, and the solution can be validated against various values of the confidence level (e.g., 90%, 95%, or 99%). A value of each of the various credibility assessment factors for the recorded interaction is also received, and a variation of the value from the confidence interval estimate is determined. The CDD score may be the sum of the variations.

In various embodiments, a weight is assigned to the various credibility assessment factors, and the weight is applied to each variation before the sum is calculated. The CDD score is then the weighted sum of the variations of the credibility assessment factors in comparison with the confidence interval. Having the concept of weights included in making this determination allows adjustment of the significance of the credibility assessment factors in the calculation of the CDD score.

In certain embodiments, the CDD score is displayed to the supervisor of the contact center agent, such as on a supervisor dashboard. In several embodiments, the CDD score is color coded based on the value of the CDD score. For example, a low CDD score (high credibility of the agent) may be color coded green, while a high CDD score (low credibility of the agent) may be color coded red.

Several advantages and benefits are attained from implementation of the present methods and systems in a contact center. First, there is a reduction in the time it takes a supervisor to prepare for coaching by allowing the coaching focal point to be more directly focused on those agents who are in need of more coaching versus those merely having a tough week or month but with good long-term assessments. Moreover, in cases where deviation from a quality plan includes a credibility score, the credibility score allows for additional quality support for those agents struggling while easing up on intervention for those agents performing at expectation. Adding a credibility score as a report metric allows for correlation analysis with one of more of: artificial intelligence (AI) categories, customer-agent matching, and sentiment analysis to measure the true impact of low/high performers.

Advantageously, the present invention directly improves operational efficiency of a contact center. It also leads to better customer engagement and improved customer experience, resulting in increased Net Promoter Scores (NPS). It also helps in creating and maintaining positive customer experiences, and maintaining a vital connection between an organization and its customers.

In addition, the present systems and methods can advantageously reduce a contact center's costs, increase agent efficiency, and increase agent and/or customer satisfaction or both. The present invention leads to reduced agent attrition, which results in lower agent turnover rates, resulting in decreased recruiting, new hire, onboarding, and new employee training costs. Hiring a new agent often requires training, direct recruiting costs, and lost productivity during ramp up. Contact centers spend a significant amount of time training and onboarding new agents. This is potentially problematic for an industry with high, or even above average, annual turnover rates. The present invention acts as a service differentiator for a contact center and its customers.

Figure 1:
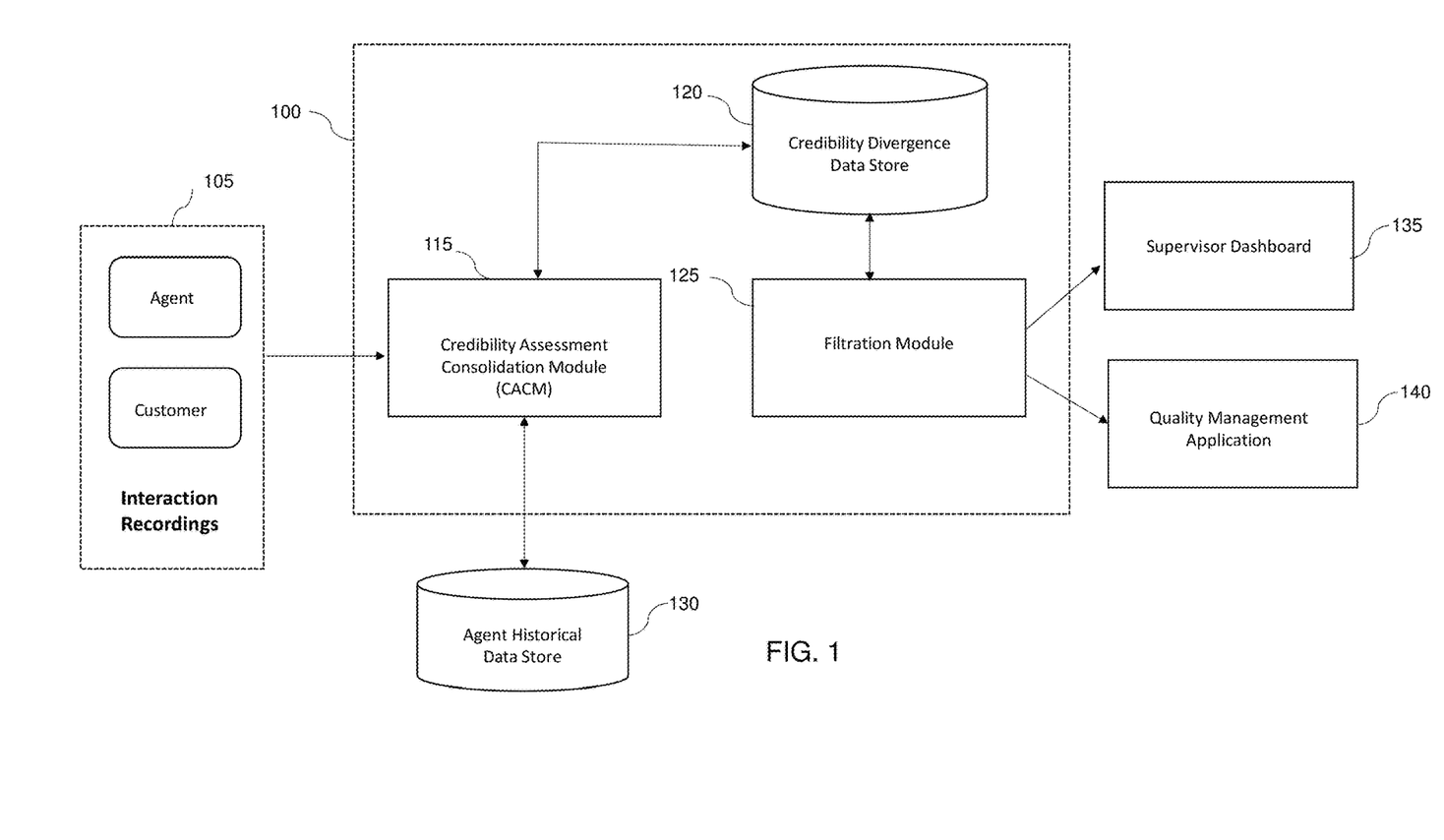
FIG. 1 is a simplified block diagram of an agent credibility system according to various aspects of the present disclosure.

FIG. 1 illustrates a block diagram of an exemplary agent credibility system 100 according to embodiments of the present disclosure. The system 100 includes credibility assessment consolidation module (CACM) 115, credibility divergence data store 120, and filtration module 125. CACM 115 evaluates the credibility of an agent based on the values of certain credibility assessment factors retrieved from the agent historical data store 130. CACM 115 determines the CDD score. In certain embodiments, CACM 115 runs in certain duty cycles, retrieves certain historical credibility assessment factors associated with the agents, and then compares the relevant factors with recent agent interactions to generate a CDD score of an agent. The lower the CDD score, the higher the credibility of the agent. A higher CDD score indicates a lower credibility of the agent.

Once the CDD score of the agent is determined, the CDD score may be stored in credibility divergence data store 120. Credibility divergence data store 120 is used to retrieve the CDD score for the applicable agent(s). In several embodiments, CACM 115 updates the value of the CDD score of each agent when the agent handles a new evaluated interaction.

Filtration module 125 filters out unnecessary agent interactions from quality processes. Quality processes include providing an agent interaction to a supervisor dashboard 135 or to a quality management application 140. Supervisor dashboard 135 can help a supervisor gauge the agent credibility over a period of time. This can be arranged to assess the agent credibility in the absolute, or relative to other agents (e.g., the lowest scoring 5% or 10% of the agents, or comparison to a standard deviation from the credibility of all agents, etc.). Quality management application 140 is a tool used to assign an interaction to an evaluator, along with the CDD score of the agent, which can be further utilized by the evaluator for the evaluation purpose. A supervisor or the quality management application 140 can then decide to assign a coaching package to the agent when the CDD score is too high, which indicates poor performance of an agent that needs to be improved.

In an exemplary embodiment, a contact center agent handles certain interactions with customers, and those interactions are recorded. The meta data of those recorded interactions 105 are sent to CACM 115. CACM 115 then determines the confidence interval estimate of the agent for certain credibility assessment factors based on the historical information retrieved from agent historical data store 130. Based on the confidence interval estimate and the current interactions meta data, CACM 115 evaluates the CDD score and this information is updated inside the credibility divergence data store 120. Filtration module 125 helps to filter out interactions where the CDD score lies under a certain range or ratio (e.g., 1). In various embodiments, the company or organization can set the bottom limit and/or the upper limit of the CDD score. In certain embodiments, the range of CDD scores is greater than about 0 to less than about 100.

Figure 2:
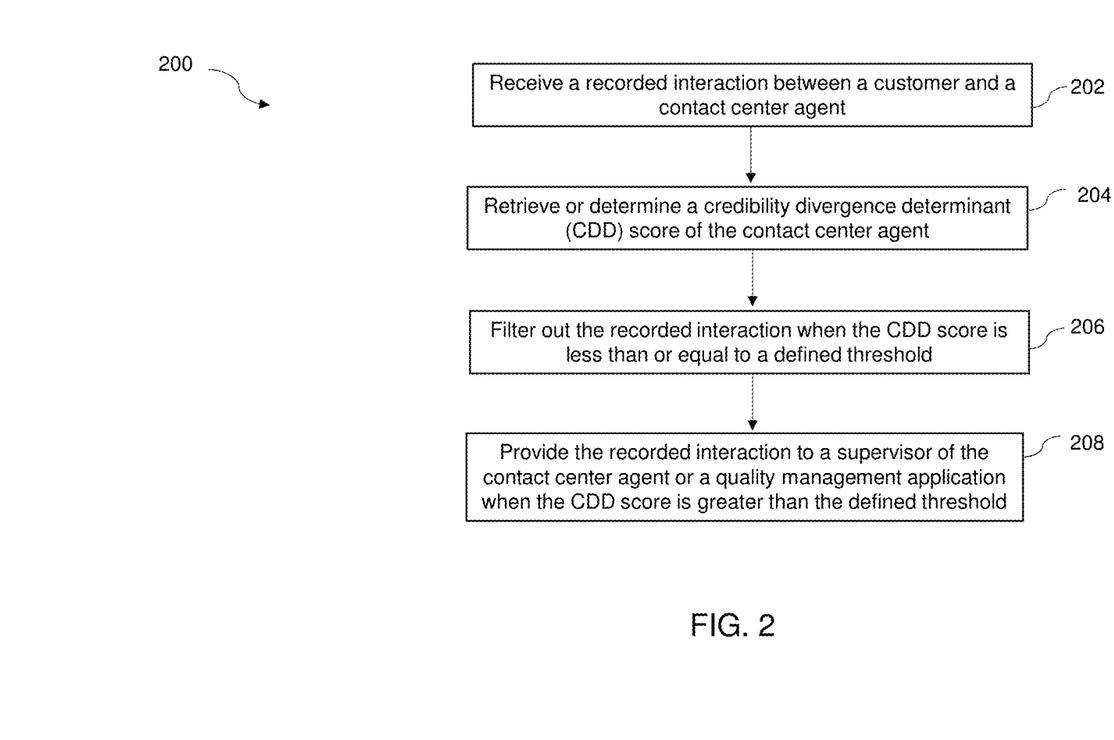
FIG. 2 is a flowchart of a method according to embodiments of the present disclosure.

Referring now to FIG. 2, a method 200 according to embodiments of the present disclosure is described. At step 202, CACM 115 receives a recorded interaction between a customer and a contact center agent. At step 204, CACM 115 retrieves or determines a CDD score of the contact center agent. CACM 115 can retrieve the CDD score from credibility divergence data store 120. In other embodiments, CACM 115 determines the CDD score, as will be explained in more detail below with respect to FIG. 3. At step 206, filtration module 125 filters out the recorded interaction when the CDD score is less than or equal to a defined threshold. In an exemplary embodiment, filtration module 125 filters out the recorded interaction when the CDD score is less than or equal to one. At step 208, filtration module 125 provides the recorded interaction to a supervisor of the contact center (e.g., via supervisor dashboard 135) or a quality management application 140 when the CDD score is greater than the defined threshold. For example, filtration module 125 provides the recorded interaction to the supervisor or quality management application 140 when the CDD score is greater than one and less than 100.

Figure 3:
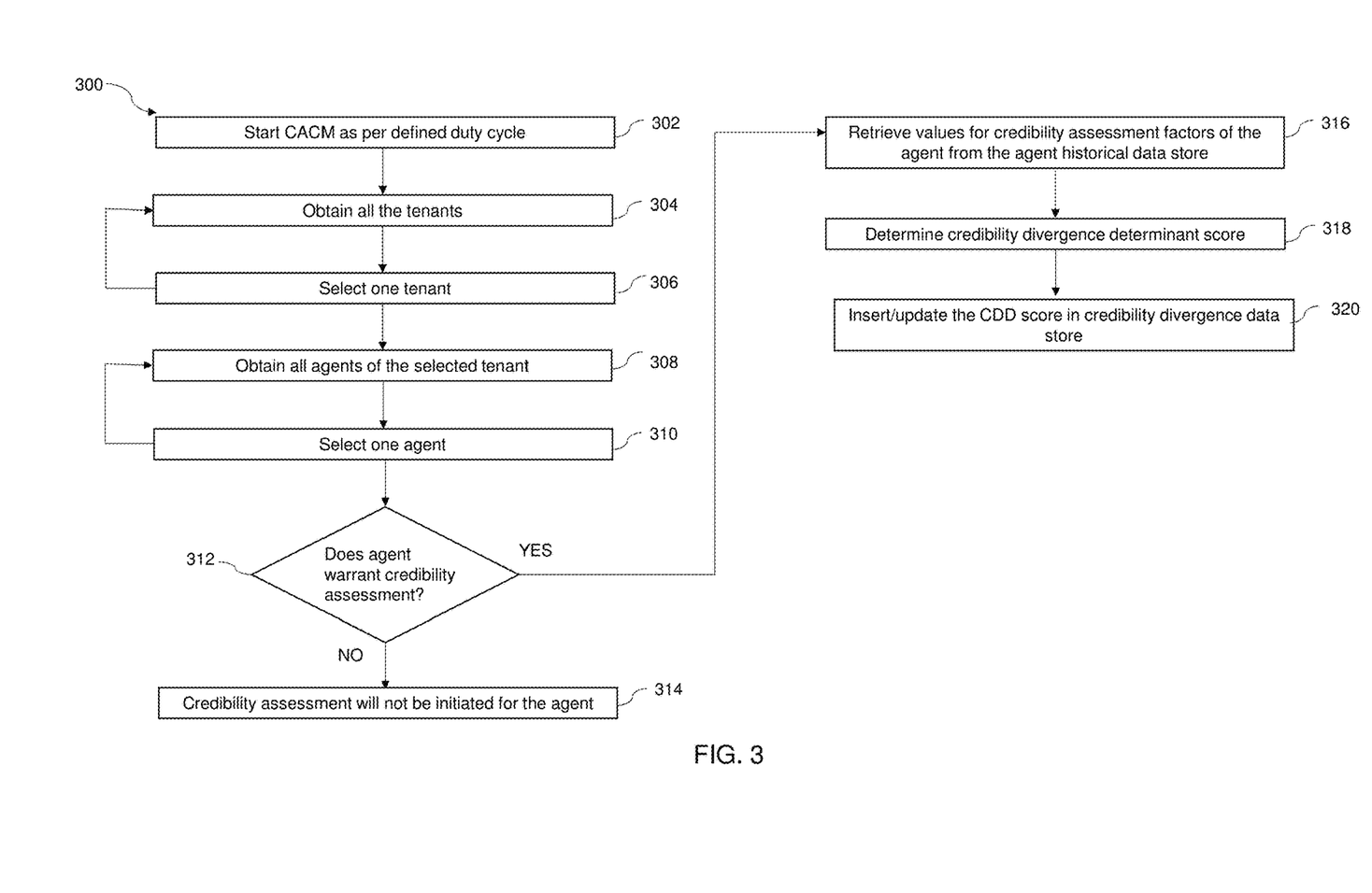
FIG. 3 is another flowchart of a method according to embodiments of the present disclosure.

Referring now to FIG. 3, a method 300 for calculating or determining a CDD score is shown. At step 302, CACM 115 is started per a defined duty cycle. A duty cycle is a time period in which CACM 115 runs periodically. For example, the duty cycle can be configured to be every 2-4 hours (e.g., 3 hours). At step 304, CACM 115 obtains all the tenants or organizations handled by the contact center. At step 306, CACM 115 selects one tenant. At step 308, CACM 115 obtains all the agents of the selected tenant. At step 310, CACM 115 selects one agent from all of the agents of the one tenant. Once one agent is selected, at step 312, CACM 115 determines whether the agent warrants a credibility assessment. For example, CACM 115 determines whether the agent satisfies a criterion for a credibility assessment. In some embodiments, one criterion would be whether the agent has served the tenant a certain number of years. If the agent does not satisfy the criterion, method 300 moves to step 314, where the credibility assessment will not be initiated for the agent.

If the agent does satisfy the criterion, then CACM 115 retrieves values for a plurality of credibility assessment factors of the agent for the specific duty cycle from agent historical data store 130 in step 316. Credibility assessment factors include, but are not limited to, duration of the contact center agent in a contact center, average manager feedback in the time interval, overall average performance trend of the contact center agent for past interactions in the time interval (e.g., KPIs), overall behavior quotient of the contact center agent for past interactions in the time interval, overall customer feedback received by the contact center agent for past interactions in the time interval, escalation count to the supervisor of the contact center agent for past interactions in the time interval, overall agent sentiment for past interactions in the time interval, schedule adherence of the contact center agent for past shifts in the time interval, rewards and recognitions received by the contact center agent in the time interval, a skillset involved for past interactions of the contact center agent in the time interval, and an absenteeism trend of the contact center agent in the time interval, and any combination thereof may be used by the CACM 115.

At step 318, CACM 115 determines or calculates the CDD score. In an exemplary embodiment, CACM 115 calculates a confidence interval estimate for each of the credibility assessment factors. Confidence interval estimates can be calculated using the following formula:

$$\mu = \bar{x} \pm Z \frac{\sigma}{\sqrt{n}}$$

Where:
μ=Confidence interval estimate
x̄=Mean
Z=Confidence coefficient
σ=Standard deviation
n=Sample size Confidence intervals indicate the likely range of values of the population mean. For example, a 95% confidence interval indicates that one can be 95% confident that the interval contains the population mean. Confidence interval estimation considers the data size (volume of the data collected) and the potential variations in the data points to estimate the range.

When the mean is calculated, there is one estimate of the metric. Confidence intervals provide richer data and show the likely values of the true population mean. A point estimate (e.g., mean) does not reveal the uncertainty associated with the estimate as compared to the confidence interval estimates.

The data points collected to measure credibility assessment are continuous numbers; hence the probability of zero deviation against the point estimate is close to zero. The computation of a confidence interval is not a resource intensive process, and a confidence level can be changed to have greater confidence. Table 1 below provides the confidence coefficient (Z score) for specific confidence levels.

TABLE 1

CONFIDENCE LEVELS AND Z SCORES

| Confidence Level | Z Score |
|---|---|
| 90% | 1.645 |
| 95% | 1.960 |
| 99% | 2.576 |

The following is an example of calculating a confidence interval estimate. Assume the values of one credibility assessment factor for a specific time interval are 5, 7, 8, 10, 12, 6, 5, 7, 7, and 8. The formula for calculating the confidence interval estimate is:

$$\mu = \bar{x} \pm Z \frac{\sigma}{\sqrt{n}}$$

TABLE 2

EXAMPLE CALCULATION OF CONFIDENCE INTERVAL ESTIMATE

| Mean (x̄) | Standard Deviation $\sigma = \sqrt{\frac{\sum(x - \text{mean})^2}{n-1}}$ | Z (Coefficient for 95% confidence level) | Confidence interval estimate (μ) |
|---|---|---|---|
| 7.5 | 2.173 | 1.960 | 7.5 + 1.34 |

Once the confidence interval estimate for a credibility assessment factor is determined, CACM 115 receives a value of the credibility assessment factor for a recorded interaction. For example, if the credibility assessment factor is overall behavior of the agent, the value for the overall behavior of the agent for the recorded interaction can be 2. CACM 115 then determines a variation from the confidence interval estimate of the value of the credibility assessment factor for the recorded interaction. For example, if the confidence interval estimate for the overall behavior of the agent is 2.5±1.44 and the value for the overall behavior of the agent for the recorded interaction is 2, then the variation is 0. The value (2) is compared with the lower bound (2.5−1.44=1.06) and upper bound (2.5+1.44=3.94) of the confidence interval estimate to check if the value is within the range. If the value is within the confidence interval range, then the variation is considered to be zero. In this case, because 2 is within the range of 1.06 and 3.94, the variation is zero. If the value is not within the confidence interval range, then the difference of the value against the lower bound and upper bound of the confidence interval estimate is determined. The two differences are compared, and the minimum difference is taken as the variation. Once the variation is determined, a sum of the variations is determined.

The following mathematical formula depicts a calculation of the CDD score:

$$CDD = \sum_{1}^{n} \left( \begin{array}{l} \text{Let } k = \begin{cases} 0 & \text{for (lower\_bound } \leq x \leq \text{upper\_bound)} \\ 1 & \text{Otherwise} \end{cases} \\ \begin{cases} 0 \text{ for } k == 0 \\ w * \begin{cases} (\text{lower\_bound} - x) \text{ for } (x < \text{lower\_bound}) \\ (x - \text{upper\_bound}) \text{ for } (x > \text{lower\_bound}) \end{cases} \Big| \text{Otherwise} \end{cases} \end{array} \right)$$

where:

x=a value of a credibility assessment factor k=temporary variable n=number of values of a credibility assessment factor lower_bound and upper_bound: minima and maxima of confidence interval estimate w: weight (initial value−1)

Tables 3 and 4 below illustrate how to use a confidence interval estimate to derive a CDD score, and how to use the CDD score.

TABLE 3

VARIATION CALCULATIONS

| Credibility Assessment Factor | Confidence Interval Estimate | Value for Credibility Assessment Factor - Agent 1 | Value for Credibility Assessment Factor - Agent 2 | Variation for Agent 1 | Variation for Agent 2 |
|---|---|---|---|---|---|
| Average Manager Feedback Issued in the Past | 7.5 ± 1.34 | 8.89 | 4.8 | 0.05 | 1.36 |
| Overall Average Performance of the Agent | 1.5 ± 0.55 | 3 | 4 | 0.95 | 1.95 |
| Overall Behavior of the Agent | 2.5 ± 1.44 | 2 | 4 | 0 | 0.06 |
| Overall Customer Feedback Received in the Past | 2.7 ± 1.14 | 3 | 0 | 0 | 1.56 |

TABLE 4

USING THE CDD SCORE

| Agent | CDD score = Σvariations | Inference | Potential Action Points |
|---|---|---|---|
| Agent 1 | 1 | Agent credibility divergence is low so credibility is high | 1. Unnecessary quality improvement process will not be assigned to the agent. 2. Routing can leverage the agent credibility score to send high value contacts to the most credible agents in addition to quality management. 3. Communication to supervisor for the agent data point for further reference. |
| Agent 2 | 4.93 | Agent credibility divergence is high so credibility is low | 1. Manager-agent communication reinitiated (mentoring). 2. Agent needs to complete certain training program and quality process will be initiated for them. |

At step 320, CACM 115 inserts or updates the CDD score in the credibility divergence data store 120. In various embodiments, the CDD score includes a time stamp to indicate the age of the CDD score or the date it was calculated. For example, the time stamp can be a date such as "May 26, 2022." In one embodiment, the CDD score can be stored in credibility divergence data store 120 as a table, as shown below.

TABLE 5

CDD SCORES

| Agent ID | CDD Score | Time Stamp |
|---|---|---|
| A | 0.5 | T1 |
| B | 0.4 | T2 |

In an exemplary embodiment, CACM 115 also assigns a weight to each credibility assessment factor, and the CDD score is the sum of the weighted variations. In some embodiments, each credibility assessment factor has an assigned weight of 1.

Figure 4:
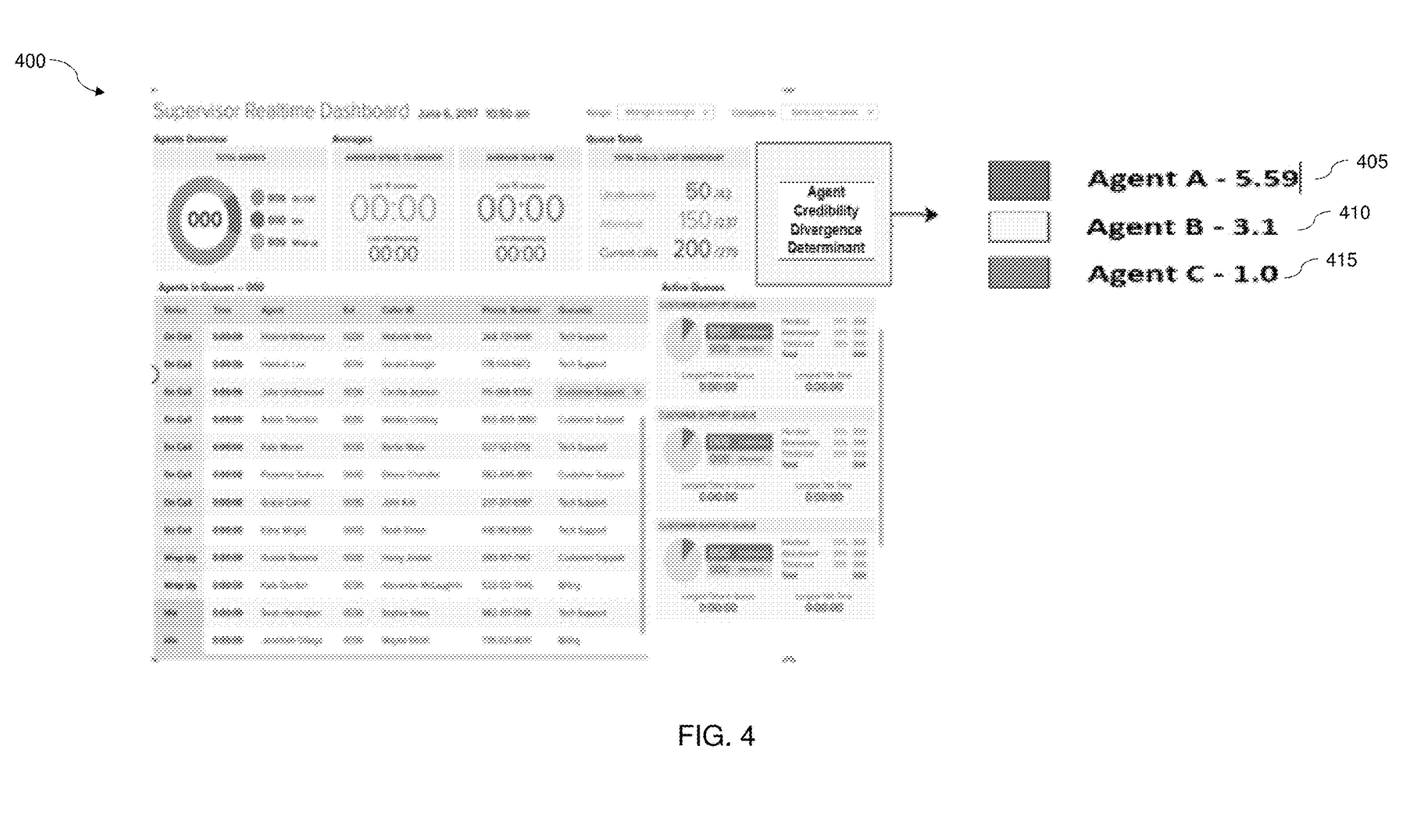
FIG. 4 illustrates an exemplary screenshot of a supervisor dashboard according to embodiments of the present disclosure.

In various embodiments, filtration module 125 displays the CDD score to the supervisor on supervisor dashboard 135. FIG. 4 is an exemplary screenshot 400 of a supervisor dashboard 135. The value of the CDD score can be categorized in three forms of color coding. For example, red, yellow, and green can be used to categorize the CDD scores of Agent A, Agent B, and Agent C. Red can be used as an indication that the CDD score for the agent is very high so the contact center needs to take appropriate action such as assigning relevant coaching and avoiding assigning high priority interactions to the agent over a certain period of time. In the screenshot 400, Agent A's score 405 would be associated with the color red since it is very high. Yellow can be used as an indication that the CDD score is medium, and relevant training should be assigned to the agent. In the screenshot 400, Agent B's score 410 would be associated with the color yellow since it is not too high. Green can be used as an indication that an agent has achieved significant credibility over a period of time, and the contact center should not require the agent to participate in a training program. In the screenshot 400, Agent C's score 415 would be associated with the color green since it is low.

Figure 5:
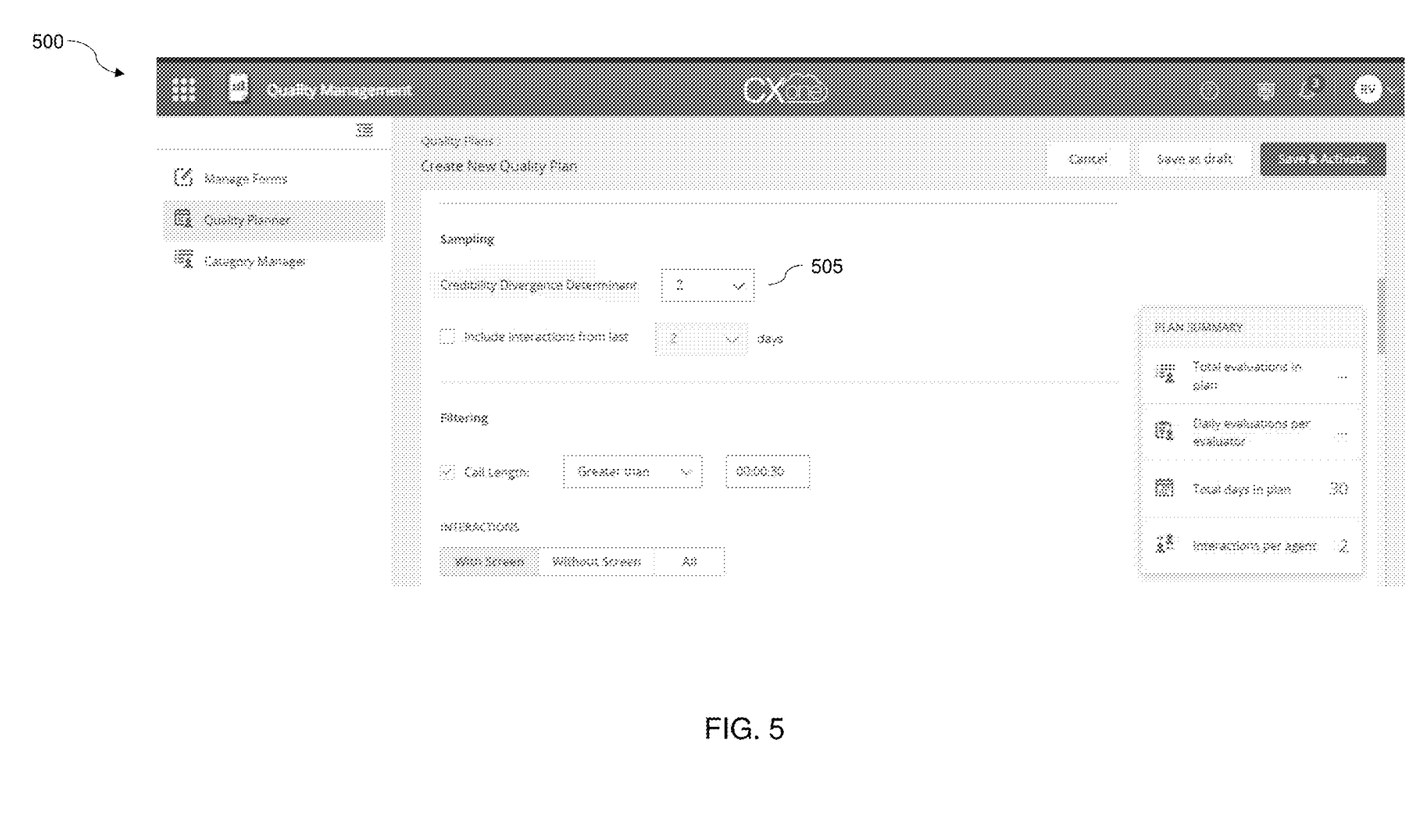
FIG. 5 illustrates an exemplary screenshot of a quality management tool according to embodiments of the present disclosure.

FIG. 5 illustrates a screenshot 500 of a quality management tool including the CDD score 505. If a manager wants to distribute interactions of an agents in which the CDD score is good, the manager can create a quality plan accordingly. This ensures that an evaluator receives those recorded interactions in which agent credibility was good. Including the CDD score in the quality management tool helps the evaluator avoid those interactions where an agent's credibility was significantly poor.

Figure 6:
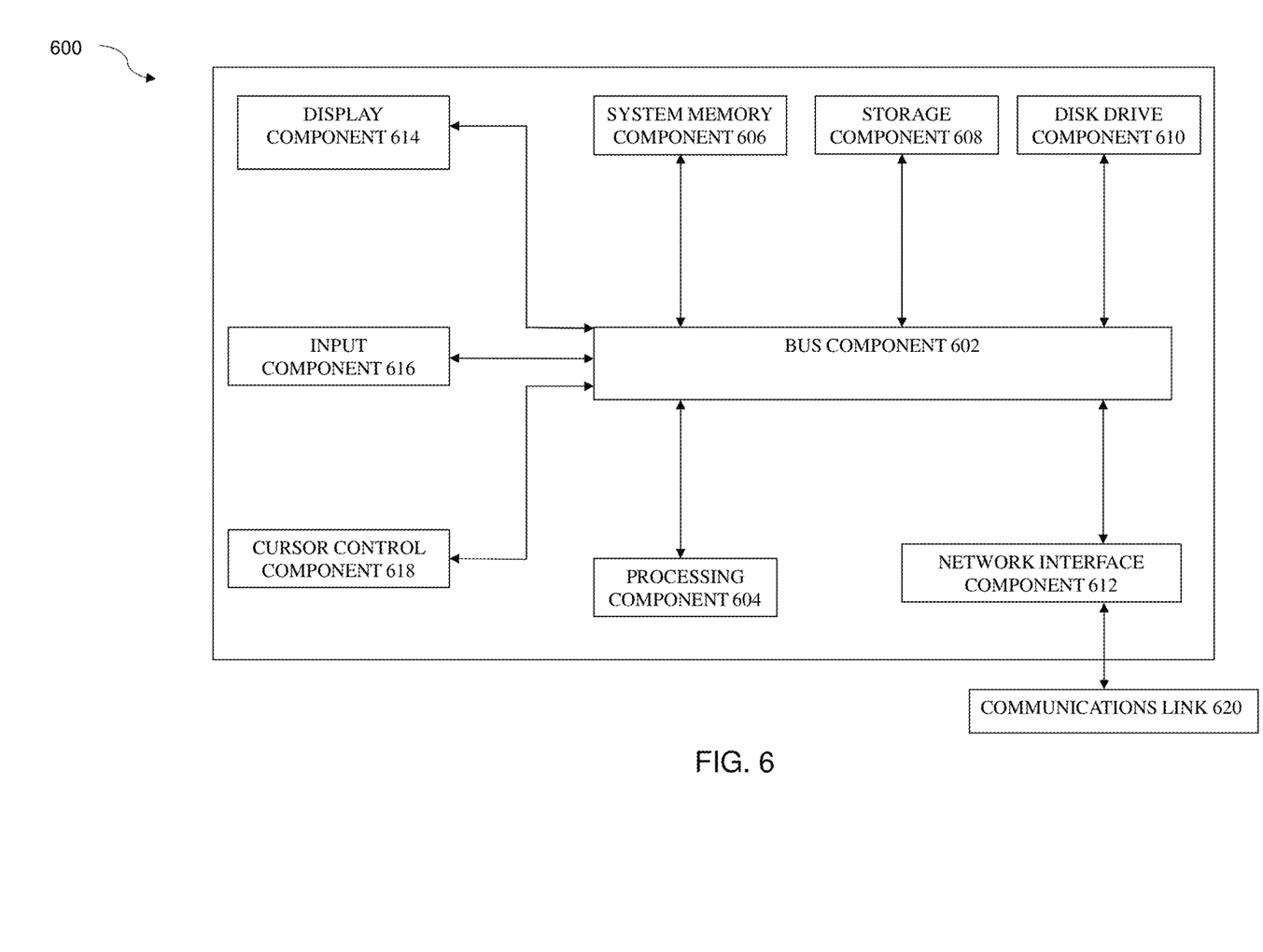
FIG. 6 is a block diagram of a computer system suitable for implementing one or more components in FIG. 1 according to one embodiment of the present disclosure.

Referring now to FIG. 6, illustrated is a block diagram of a system 600 suitable for implementing embodiments of the present disclosure. System 600, such as part a computer and/or a network server, includes a bus 602 or other communication mechanism for communicating information, which interconnects subsystems and components, including one or more of a processing component 604 (e.g., processor, micro-controller, digital signal processor (DSP), etc.), a system memory component 606 (e.g., RAM), a static storage component 608 (e.g., ROM), a network interface component 612, a display component 614 (or alternatively, an interface to an external display), an input component 616 (e.g., keypad or keyboard), and a cursor control component 618 (e.g., a mouse pad).

In accordance with embodiments of the present disclosure, system 600 performs specific operations by processor 604 executing one or more sequences of one or more instructions contained in system memory component 606. Such instructions may be read into system memory component 606 from another computer readable medium, such as static storage component 608. These may include instructions to receive a recorded interaction between a customer and a contact center agent; retrieve or determine a CDD score of the contact center agent, wherein the CDD score is based on values of a plurality of credibility assessment factors for a time interval that are stored in a historical agent database, and wherein the lower the CDD score, the higher a credibility of the contact center agent; filter out the recorded interaction when the CDD score is less than or equal to one; and provide the recorded interaction to a supervisor of the contact center agent or a quality management application when the CDD score is greater than one. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 604 for execution. Such a medium may take many forms, including but not limited to, non-volatile media, volatile media, and transmission media. In various implementations, volatile media includes dynamic memory, such as system memory component 606, and transmission media includes coaxial cables, copper wire, and fiber optics, including wires that include bus 602. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 600. In various other embodiments, a plurality of systems 600 coupled by communication link 620 (e.g., LAN, WLAN, PTSN, or various other wired or wireless networks) may perform instruction sequences to practice the disclosure in coordination with one another. Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. An agent credibility system comprising:
   a processor and a computer readable medium operably coupled thereto, the computer readable medium comprising a plurality of instructions stored in association therewith that are accessible to, and executable by, the processor, to perform operations which comprise:
      determining that a contact center agent satisfies a criterion for a credibility assessment by determining that the contact center agent has served a company or organization for a certain number of years;
      receiving a recorded interaction between a customer and the contact center agent;
      retrieving or determining a credibility divergence determinant (CDD) score of the contact center agent, wherein the CDD score characterizes past performance of the contact center agent and is based on values of a plurality of credibility assessment factors for a time interval for past interactions of the contact center agent that are stored in a historical agent database, and wherein the lower the CDD score, the higher a credibility of the contact center agent;
      when the CDD score is less than or equal to a defined threshold:
         determining that the recorded interaction should not be passed to a supervisor of the contact center agent or a quality management application, and
         filtering out the recorded interaction so that the recorded interaction is not provided to the supervisor of the contact center agent or the quality management application; and
      when the CDD score greater than the defined threshold:
         determining that the recorded interaction should be passed to the supervisor of the contact center agent or the quality management application, and
         providing the recorded interaction to the supervisor of the contact center agent or the quality management application.

2. The agent credibility system of claim 1, wherein determining the CDD score comprises:
   retrieving, from the historical agent database, the values of a plurality of credibility assessment factors of the contact center agent for the time interval;
   calculating the CDD score based on the values of the plurality of credibility assessment factors; and
   storing the CDD score in a CDD database.

3. The agent credibility system of claim 2, wherein the plurality of credibility assessment factors comprise two or more of: duration of the contact center agent in a contact center, average manager feedback in the time interval, overall average performance trend of the contact center agent for past interactions in the time interval, overall behavior quotient of the contact center agent for past interactions in the time interval, overall customer feedback received by the contact center agent for past interactions in the time interval, escalation count to the supervisor of the contact center agent for past interactions in the time interval, overall agent sentiment for past interactions in the time interval, schedule adherence of the contact center agent for past shifts in the time interval, rewards and recognitions received by the contact center agent in the time interval, a skillset involved for past interactions of the contact center agent in the time interval, and an absenteeism trend of the contact center agent in the time interval.

4. The agent credibility system of claim 2, wherein calculating the CDD score based on the values of the plurality of credibility assessment factors comprises:
    calculating a confidence interval estimate for each of the plurality of credibility assessment factors;
    receiving a value of each of the plurality of credibility assessment factors for the recorded interaction;
    determining a variation from the confidence interval estimate for the value of each of the plurality of credibility assessment factors for the recorded interaction; and
    computing a sum of the variations.

5. The agent credibility system of claim 4, wherein calculating the CDD score further comprises assigning a weight to each of the plurality of credibility assessment factors, wherein computing the sum of the variations comprises applying the weight to each variation.

6. The agent credibility system of claim 1, wherein the operations further comprise updating the CDD score.

7. The agent credibility system of claim 1, wherein the operations further comprise displaying the CDD score to the supervisor on a supervisor dashboard.

8. The agent credibility system of claim 7, wherein the CDD score is color-coded based on a value of the CDD score.

9. A method of using agent credibility in a contact center, which comprises:
    determining that a contact center agent satisfies a criterion for a credibility assessment by determining that the contact center agent has served a company or organization for a certain number of years;
    receiving a recorded interaction between a customer and the contact center agent;
    retrieving or determining a credibility divergence determinant (CDD) score of the contact center agent, wherein the CDD score characterizes past performance of the contact center agent and is based on values of a plurality of credibility assessment factors for a time interval for past interactions of the contact center agent that are stored in a historical agent database, and wherein the lower the CDD score, the higher a credibility of the contact center agent;
    when the CDD score is less than or equal to a defined threshold:
        determining that the recorded interaction should not be passed to a supervisor of the contact center agent or a quality management application, and
        filtering out the recorded interaction so that the recorded interaction is not provided to the supervisor of the contact center agent or the quality management application; and
    when the CDD score greater than the defined threshold:
        determining that the recorded interaction should be passed to the supervisor of the contact center agent or the quality management application, and
        providing the recorded interaction to the supervisor of the contact center agent or the quality management application.

10. The method of claim 9, wherein determining the CDD score comprises:
    retrieving, from the historical agent database, the values of the plurality of credibility assessment factors of the contact center agent for the time interval;
    calculating the CDD score based on the values of the plurality of credibility assessment factors; and
    storing the CDD score in a CDD database.

11. The method of claim 10, wherein the plurality of credibility assessment factors comprise two or more of: duration of the contact center agent in a contact center, average manager feedback in the time interval, overall average performance trend of the contact center agent for past interactions in the time interval, overall behavior quotient of the contact center agent for past interactions in the time interval, overall customer feedback received by the contact center agent for past interactions in the time interval, escalation count to the supervisor of the contact center agent for past interactions in the time interval, overall agent sentiment for past interactions in the time interval, schedule adherence of the contact center agent for past shifts in the time interval, rewards and recognitions received by the contact center agent in the time interval, a skillset involved for past interactions of the contact center agent in the time interval, and an absenteeism trend of the contact center agent in the time interval.

12. The method of claim 10, wherein calculating the CDD score based on the values of the plurality of credibility assessment factors comprises:
    calculating a confidence interval estimate for each of the plurality of credibility assessment factors;
    receiving a value of each of the plurality of credibility assessment factors for the recorded interaction;
    determining a variation from the confidence interval estimate for the value of each of the plurality of credibility assessment factors for the recorded interaction; and
    computing a sum of the variations.

13. The method of claim 12, wherein calculating the CDD score further comprises assigning a weight to each of the plurality of credibility assessment factors, wherein computing the sum of the variations comprises applying the weight to each variation.

14. The method of claim 9, which further comprises updating the CDD score.

15. The method of claim 9, which further comprises displaying the CDD score to the supervisor on a supervisor dashboard, wherein the CDD score is color-coded based on the CDD score.

16. A non-transitory computer-readable medium having stored thereon computer-readable instructions executable by a processor to perform operations which comprise:
    determining that a contact center agent satisfies a criterion for a credibility assessment by determining that the contact center agent has served a company or organization for a certain number of years;

receiving a recorded interaction between a customer and the contact center agent;

retrieving or determining a credibility divergence determinant (CDD) score of the contact center agent, wherein the CDD score characterizes past performance of the contact center agent and is based on values of a plurality of credibility assessment factors for a time interval for past interactions of the contact center agent that are stored in a historical agent database, and wherein the lower the CDD score, the higher a credibility of the contact center agent;

when the CDD score is less than or equal to a defined threshold:
　determining that the recorded interaction should not be passed to a supervisor of the contact center agent or a quality management application, and
　filtering out the recorded interaction so that the recorded interaction is not provided to the supervisor of the contact center agent or the quality management application; and when the CDD score greater than the defined threshold:
　determining that the recorded interaction should be passed to the supervisor of the contact center agent or the quality management application, and
　providing the recorded interaction to the supervisor of the contact center agent or the quality management application.

17. The non-transitory computer-readable medium of claim 16, wherein determining the CDD score comprises:
　retrieving, from the historical agent database, the values of a plurality of credibility assessment factors of the contact center agent for a time interval;
　calculating the CDD score based on the values of the plurality of credibility assessment factors; and
　storing the CDD score in a CDD database.

18. The non-transitory computer-readable medium of claim 17, wherein the plurality of credibility assessment factors comprise two or more of: duration of the contact center agent in a contact center, average manager feedback in the time interval, overall average performance trend of the contact center agent for past interactions in the time interval, overall behavior quotient of the contact center agent for past interactions in the time interval, overall customer feedback received by the contact center agent for past interactions in the time interval, escalation count to the supervisor of the contact center agent for past interactions in the time interval, overall agent sentiment for past interactions in the time interval, schedule adherence of the contact center agent for past shifts in the time interval, rewards and recognitions received by the contact center agent in the time interval, a skillset involved for past interactions of the contact center agent in the time interval, and an absenteeism trend of the contact center agent in the time interval.

19. The non-transitory computer-readable medium of claim 17, wherein calculating the CDD score based on the values of the plurality of credibility assessment factors comprises:
　calculating a confidence interval estimate for each of the plurality of credibility assessment factors;
　receiving a value of each of the plurality of credibility assessment factors for the recorded interaction;
　determining a variation from the confidence interval estimate for the value of each of the plurality of credibility assessment factors for the recorded interaction; and
　computing a sum of the variations.

20. The non-transitory computer-readable medium of claim 19, wherein calculating the CDD score further comprises assigning a weight to each of the plurality of credibility assessment factors, wherein computing the sum of the variations comprises applying the weight to each variation.

* * * * *